(12) United States Patent
Kim et al.

(10) Patent No.: US 10,310,653 B2
(45) Date of Patent: Jun. 4, 2019

(54) DISPLAY PANEL WITH TOUCH PADS AND TEST SIGNAL LINES

(71) Applicant: LG Display Co., Ltd., Seoul (KR)

(72) Inventors: Sudong Kim, Seoul (KR); Jinho Lim, Goyang-si (KR); Sangbin Lee, Goyang-si (KR); Jongseok Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/799,789

(22) Filed: Oct. 31, 2017

(65) Prior Publication Data

US 2018/0150162 A1 May 31, 2018

(30) Foreign Application Priority Data

Nov. 30, 2016 (KR) .................. 10-2016-0161556

(51) Int. Cl.
| | |
|---|---|
| *G06F 11/22* | (2006.01) |
| *G06F 3/041* | (2006.01) |
| *G06F 3/044* | (2006.01) |
| *G02F 1/1345* | (2006.01) |
| *G02F 1/1333* | (2006.01) |
| *G02F 1/1343* | (2006.01) |
| *G02F 1/1362* | (2006.01) |

(52) U.S. Cl.
CPC ........ *G06F 3/0412* (2013.01); *G02F 1/13454* (2013.01); *G06F 3/0418* (2013.01); *G06F 11/2221* (2013.01); *G02F 1/1343* (2013.01); *G02F 1/13338* (2013.01); *G02F 2001/136254* (2013.01); *G06F 3/044* (2013.01)

(58) Field of Classification Search
None
See application file for complete search history.

(56) References Cited

U.S. PATENT DOCUMENTS

| | | | | |
|---|---|---|---|---|
| 7,675,600 | B2* | 3/2010 | Jeoung | G02F 1/13458 324/760.01 |
| 8,083,561 | B1* | 12/2011 | Huang | G02F 1/136259 345/76 |
| 8,125,237 | B2* | 2/2012 | Sellathamby | G09G 3/006 324/760.02 |
| 8,125,605 | B2* | 2/2012 | Jeoung | G02F 1/13458 324/760.01 |
| 8,830,153 | B2* | 9/2014 | Huang | G02F 1/136259 345/204 |
| 8,994,396 | B2* | 3/2015 | Ho | G09G 3/3233 324/760.01 |
| 9,024,913 | B1* | 5/2015 | Jung | G06F 3/044 345/174 |
| 9,513,670 | B2* | 12/2016 | Chen | G06F 1/1656 |
| 9,767,767 | B2* | 9/2017 | Kong | G09G 3/3291 |

(Continued)

*Primary Examiner* — Chad M Dicke
(74) *Attorney, Agent, or Firm* — Fenwick & West LLP

(57) ABSTRACT

A display panel includes a plurality of touch blocks matrix-arranged and corresponding to each of two or more adjacent pixel areas of the plurality of pixel areas, and first, second, third and fourth test signal lines through which first, second, third and fourth test signals are supplied by an auto probing unit. Accordingly, not only a defect in an image output function, but also a defect in a touch sensing function can be inspected prior to a modularization process by using the first, second, third and fourth test signals.

7 Claims, 10 Drawing Sheets

(56) References Cited

U.S. PATENT DOCUMENTS

| | | | | |
|---|---|---|---|---|
| 10,001,886 B2* | 6/2018 | Han | | G06F 3/044 |
| 10,013,091 B2* | 7/2018 | Katsuta | | G06F 3/0412 |
| 10,013,121 B2* | 7/2018 | Wang | | G06F 3/0412 |
| 10,051,705 B2* | 8/2018 | Song | | H05B 33/0845 |
| 10,056,019 B2* | 8/2018 | Huang | | G09G 3/3655 |
| 2001/0055084 A1* | 12/2001 | Yokoyama | | G02F 1/133514 |
| | | | | 349/133 |
| 2002/0085169 A1* | 7/2002 | Choi | | G02F 1/1309 |
| | | | | 349/192 |
| 2007/0018680 A1* | 1/2007 | Jeon | | G09G 3/006 |
| | | | | 324/750.3 |
| 2007/0170949 A1* | 7/2007 | Pak | | G09G 3/006 |
| | | | | 324/760.01 |
| 2008/0170195 A1* | 7/2008 | Kwon | | G02F 1/1309 |
| | | | | 349/143 |
| 2013/0215075 A1* | 8/2013 | Lee | | G06F 3/044 |
| | | | | 345/174 |
| 2013/0265069 A1* | 10/2013 | Deng | | G09G 3/006 |
| | | | | 324/750.3 |
| 2014/0184543 A1* | 7/2014 | Kim | | G06F 3/0412 |
| | | | | 345/173 |
| 2015/0179132 A1* | 6/2015 | Lee | | G09G 5/006 |
| | | | | 345/174 |
| 2015/0185943 A1* | 7/2015 | Wen | | G06F 3/0412 |
| | | | | 345/174 |
| 2016/0098126 A1* | 4/2016 | Lee | | G06F 3/044 |
| | | | | 345/174 |
| 2016/0246432 A1* | 8/2016 | Hong | | G06F 3/044 |
| 2016/0283039 A1* | 9/2016 | Tokita | | G02F 1/1309 |
| 2016/0357333 A1* | 12/2016 | Huang | | G06F 3/044 |
| 2017/0017325 A1* | 1/2017 | Tsai | | G06F 3/0412 |
| 2017/0205956 A1* | 7/2017 | Li | | G02F 1/13338 |
| 2017/0220153 A1* | 8/2017 | Koide | | G06F 3/044 |
| 2017/0242521 A1* | 8/2017 | Xie | | G06F 3/0416 |
| 2017/0242529 A1* | 8/2017 | Park | | G06F 3/0416 |
| 2018/0039119 A1* | 2/2018 | Aoki | | G06F 3/0412 |
| 2018/0157366 A1* | 6/2018 | Du | | G06F 3/0416 |
| 2018/0224973 A1* | 8/2018 | Teranishi | | G06F 3/044 |

* cited by examiner

DISPLAY PANEL WITH TOUCH PADS AND TEST SIGNAL LINES

CROSS-REFERENCE TO RELATED APPLICATIONS

This application claims the priority of Republic of Korea Patent Application No. 10-2016-0161556 filed on Nov. 30, 2016, in the Republic of Korea Intellectual Property Office, the disclosure of which is hereby incorporated herein by reference in its entirety.

BACKGROUND

Field of Technology

The present disclosure relates to a display panel, and more particularly, to a display panel having a touch sensing function.

Description of the Related Art

Flat display devices are applied to various electronic devices such as TVs, mobile phones, laptop computers, and tablets. To this end, research to develop thin, light, and low power consuming display devices has been made.

The flat display device typically includes a liquid crystal display device (LCD), a plasma display panel device (PDP), a field emission display device (FED), an electro luminescence display device (ELD), an electro-wetting display device (EWD), and an organic light emitting display device (OLED).

A general flat display device includes a pair of substrates combined facing each other and a display panel arranged between the pair of substrates and including a polarizing material or a luminescent material.

In an example, the liquid crystal display device includes a liquid crystal display panel that uses a liquid crystal material as a polarizing material. The liquid crystal display panel includes a pair of substrates combined facing each other and a liquid crystal layer arranged between the pair of substrates and including a liquid crystal material that polarizes light.

The liquid crystal display panel generates an electric field between a pixel electrode and a common electrode of each of a plurality of pixel areas defined in a display area for displaying an image. As a tilt angle of the liquid crystal material of the liquid crystal layer is changed by the electric field, light transmittance of each pixel area is adjusted. As such, the liquid crystal display panel may display an image in the display area by adjusting the light transmittance of each of the pixel areas.

The liquid crystal display device that is advantageous for implementing a thin, light, and low power consuming display device has been used for various electronic devices such as laptop computers, monitors, automation apparatuses, and portable communication apparatuses.

To improve convenience of a user, the display devices have been developed and commercialized to have a structure including a touch sensing function. The touch sensing function is a function to sense a position in the display area contacted by a finger of a human or an object, which may be used as a device to intuitively receive an input of a user's command.

For example, a method of including a touch sensing function in a display device may include an add-on type of attaching a separate touch panel for the touch sensing function on a display panel and an in-cell type of using at least one of elements for an image output function of the display panel for implementing the touch sensing function.

In the add-on type, since a touch panel is separately provided, the image output function and the touch sensing function may be independently performed without mutual influence, and thus a defect in the touch panel may be easily inspected. In other words, in the add-on type, since a defect in the touch panel may be inspected before the touch panel is attached to the display panel, a defect rate of the display panel may not be relative to the defect in the touch sensing function. However, according to the add-on type, as the separate touch panel is added, there is a limit in making a thin and light display device and display properties may be deteriorated because light emitted from a liquid crystal display panel is slightly lost by the touch panel.

In contrast, compared to the add-on type, the in-cell type is advantageous in making a thin and light display device because the display device does not include a separate touch panel. However, due to the element shared for the image output function and the touch sensing function, the image output function and the touch sensing function are performed in a time-division method, and thus a defect rate of the display panel is affected by the defect in the touch sensing function.

In general, after manufacturing an in-cell type display panel, the display panel may be inspected by using an auto probe inspection method using an auto probing unit.

According to a conventional auto probe inspection method, after the auto probing unit and the display panel are connected to each other via a test pad provided in the display panel, an identical pixel signal and an identical same common signal are supplied to a plurality of sub-pixels of the display panel by using the auto probing unit. Thus, a defect in the image output function may be inspected by checking whether brightness of the sub-pixels is uniformly generated. However, when a conventional auto probing unit is used, since the identical common signal is supplied to the sub-pixels, while only the defect in the image output function may be inspected, the defect in the touch sensing function may not be inspected.

Accordingly, the defect in the touch sensing function of an in-cell type display panel is generally inspected by using driving units after a modularization process of connecting the driving units to the display panel. In other words, since the defect in the touch sensing function of the display panel is inspected after the modularization process, the yield of a display device is lowered and there is a limit in reducing the manufacturing costs of a display device.

SUMMARY

It is an object of the present disclosure to provide a display panel in which not only a defect in an image output function, but also a defect in a touch sensing function may be inspected by using an auto probing unit.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a display panel includes a plurality of touch blocks matrix-arranged and corresponding to each of two or more adjacent pixel areas of the plurality of pixel areas, and first, second, third and fourth test signal lines through which first, second, third and fourth test signals are supplied by an auto probing unit.

Four routing lines corresponding to four touch blocks of the plurality of touch blocks, the four touch blocks being adjacent to one another in a first direction, may be connected to the first, second, third and fourth test signal lines that are different from one another. Four routing lines corresponding to four touch blocks of the plurality of touch blocks, the four touch blocks being adjacent to one another in a second direction crossing the first direction, may be connected to the first, second, third and fourth test signal lines that are different from one another.

Any one of the first, second, third and fourth test signals that is sequentially selected may be supplied at a first voltage level, and the other first, second, third and fourth test signals, except a selected test signal, may be supplied at a second voltage level that is different from the first voltage level.

DETAILED DESCRIPTION

Figure 1:
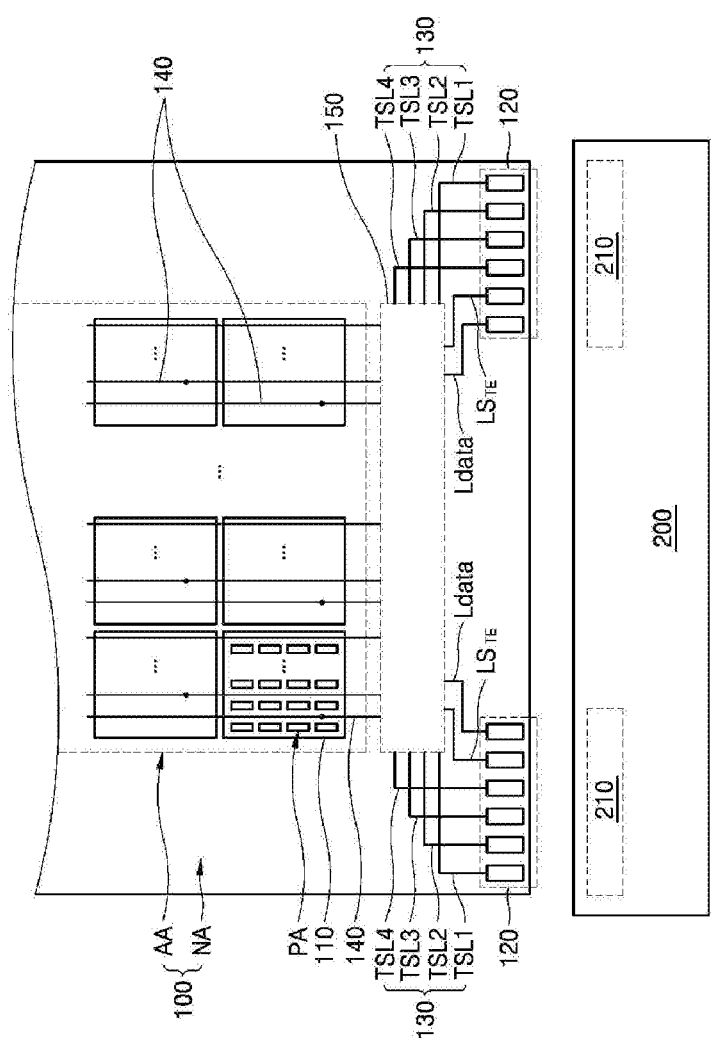
FIG. 1 illustrates a display panel according to an embodiment of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

First, a display panel according to an embodiment of the present disclosure is described with reference to FIGS. 1 and 2.

FIG. 1 illustrates a display panel according to an embodiment of the present disclosure. FIG. 2 illustrates a touch block, a routing line, first, second, third and fourth test signal lines, and a switch unit of FIG. 1.

As illustrated in FIG. 1, a display panel 100 according to an embodiment of the present disclosure may include a display area AA for displaying an image according to an image output function, and a non-display area NA located outside the display area AA.

The display panel 100 may include a plurality of pixel areas PA defined in the display area AA, a plurality of touch blocks 110 corresponding to two or more adjacent pixel areas among the pixel areas PA, first, second, third, and fourth test signal lines TSL1, TSL2, TSL3, and TSL4 130 through which first, second, third, and fourth test signals are supplied by an auto probing unit 200, and a routing line 140 connected between one of the first, second, third and fourth test signal lines TSL1, TSL2, TSL3, and TSL4 130 and each of the touch blocks 110.

The display panel 100 may further include a test pad portion 120 arranged at opposite sides of a pad area adjacent to one side of the display area AA in the non-display area NA and including pads to which the auto probing unit 200 is connected, and a switch unit 150 including a plurality of test drive switches arranged between any one of the first, second, third and fourth test signal lines TSL1, TSL2, TSL3, and TSL4 130 and each routing line 140.

The display panel 100 according to an embodiment of the present disclosure includes an in-cell type touch sensing function as well as the image output function. To this end, the display panel 100 may include a plurality of pixel electrodes (not shown) corresponding to the pixel areas PA and the touch blocks 110 each corresponding to adjacent two or more pixels areas PA.

The pixel areas PA correspond to a plurality of sub-pixels and are matrix-arranged in the display area AA. Accordingly, the pixel electrodes corresponding to the pixel areas PA are also matrix-arranged in the display area AA.

The touch blocks 110 are matrix-arranged in the display area AA. Each of the touch blocks 110 corresponding to the adjacent two or more pixel areas PA. The number of the touch blocks 110 arranged in the display area AA may be determined according to the sensitivity and accuracy of the touch sensing function, and the size and resolution of the display area AA. In an example of a portable compact display panel, the touch blocks 110 may be matrix-arranged by 18 rows and 30 columns.

The test pad portion 120 is arranged in the pad area that is a part of the non-display area NA, and to which the auto probing unit 200 is connected.

The auto probing unit 200 is a device to supply signals to detect a defect of the display panel 100 prior to a modularization process of connecting a driving unit to the display panel 100.

According to an embodiment of the present disclosure, the auto probing unit 200 supplies a pixel signal corresponding to the pixel electrodes, the first, second, third and fourth test signals corresponding to the touch blocks 110, and a test enable signal $S_{TE}$ corresponding to the supply of the first, second, third and fourth test signals.

The pixel signal by the auto probing unit 200 is supplied to the pixel electrodes corresponding to the pixel areas PA via a pixel signal line Ldata connected between the test pad portion 120 and each of the pixel electrodes. The auto probing unit 200 may include a unit pad portion 210 connected to the test pad portion 120 of the display panel 100.

The test enable signal $S_{TE}$ is supplied by the auto probing unit 200 to a test enable signal line $LS_{TE}$ connected between the test pad portion 120 and the switch unit 150.

The first, second, third and fourth test signals are supplied by the auto probing unit 200 to the first, second, third and fourth test signal lines TSL1, TSL2, TSL3, and TSL4 130 connected between the test pad portion 120 and the switch unit 150.

The first, second, third and fourth test signal lines TSL1, TSL2, TSL3, and TSL4 130 are connected to the routing line 140 arranged in the display area AA through the switch unit 150.

The routing line 140 is connected between the switch unit 150 connected to the first, second, third and fourth test signal lines TSL1, TSL2, TSL3, and TSL4 130 and the touch blocks 110. In other words, each routing line 140 connects between any one of the first, second, third and fourth test signal lines TSL1, TSL2, TSL3, and TSL4 130 and each of the touch blocks 110.

The connection between the routing line 140 and the test signal line 130 is controlled by the switch unit 150. Accordingly, when the routing line 140 is connected to the test signal line 130 by the switch unit 150, an inspection to detect a defect of the display panel 100 by using the first, second, third and fourth test signals supplied through the first, second, third and fourth test signal lines TSL1, TSL2, TSL3, and TSL4 130 is performed. In contrast, when the routing line 140 and the test signal line 130 are disconnected from each other by the switch unit 150, the routing line 140 supplies touch drive signals supplied from a driving unit(not shown) connected to a pad portion (not shown) to the touch blocks 110.

Figure 2:
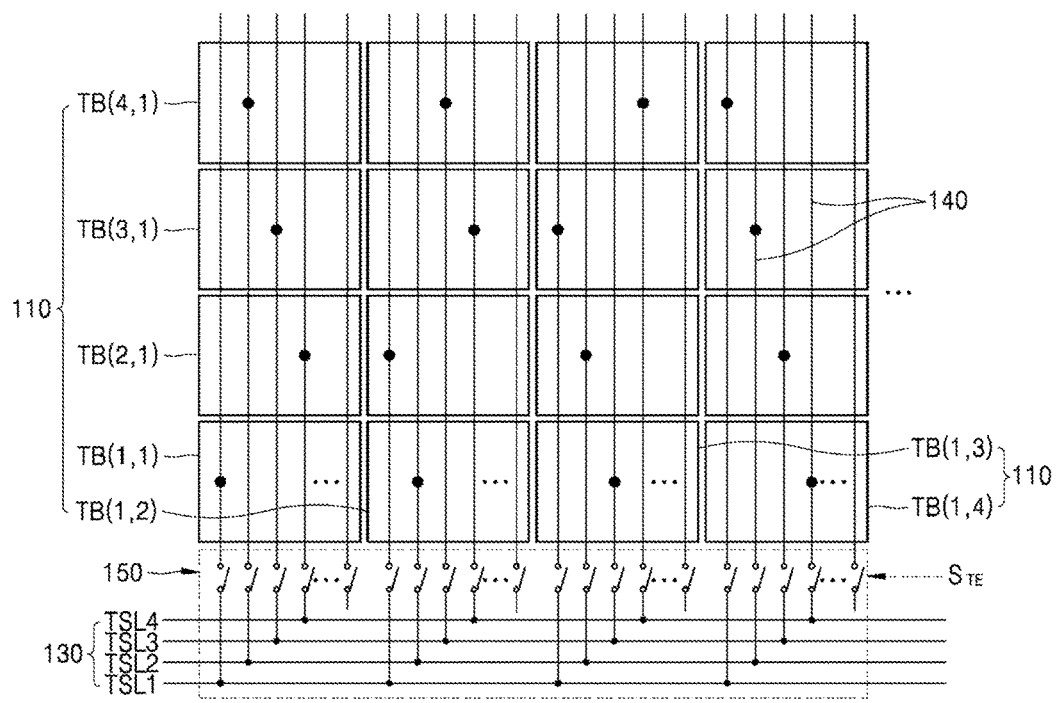
FIG. 2 illustrates a touch block, a routing line, first, second, third and fourth test signal lines, and a switch unit of FIG. 1.

As illustrated in FIG. 2, the switch unit 150 may include the test drive switches arranged between any one of the first, second, third and fourth test signal lines TSL1, TSL2, TSL3, and TSL4 130 and each routing line 140.

In this state, the test drive switches are turned on or off based on the test enable signal $S_{TE}$ by the auto probing unit 200 of FIG. 1.

Four routing lines 140 corresponding to four touch blocks TB(1,1), TB(1,2), TB(1,3), and TB(1,4) adjacent to one another in a first direction that is the horizontal direction of FIG. 2 among the touch blocks 110 are connected to the first, second, third and fourth test signal lines TSL1, TSL2, TSL3, and TSL4 130 that are different from one another, via the test drive switches of the switch unit 150.

Also, four routing lines 140 corresponding to four touch blocks TB(1,1), TB(2,1), TB(3,1), and TB(4,1) adjacent to one another in a second direction that is the vertical direction of FIG. 2 among the touch blocks 110 are connected to the first, second, third and fourth test signal lines TSL1, TSL2, TSL3, and TSL4 130 that are different from one another, via the test drive switches of the switch unit 150.

In the display panel 100 configured as above, to inspect the defect in an image output function and the defect in the touch sensing function, the unit pad portion 210 of the auto probing unit 200 and the test pad portion 120 of the display panel 100 are connected to each other.

The auto probing unit 200 supplies identical pixel signals to the pixel electrodes via the pixel signal line Ldata connected to the pixel electrodes. In this state, the auto probing unit 200 supplies any one of the first, second, third and fourth test signals applied to the first, second, third and fourth test signal lines TSL1, TSL2, TSL3, and TSL4 130, the test signals being sequentially selected, at a first voltage level, and the other test signals at a second voltage level different from the first voltage level.

The test signal of the first voltage level is a common signal to allow the pixel areas PA to emit light in response to the pixel signal via the pixel signal line Ldata. In contrast, when the test signal of the second voltage level is supplied, the pixel areas PA are in a black state in which no light is emitted.

In other words, the pixel areas PA corresponding to the touch blocks 110 to which the test signal of the first voltage level is supplied emit light at a certain luminance. In contrast, the pixel areas PA corresponding to the touch blocks 110 to which the test signal of the second voltage level is supplied is in a black state in which no light is emitted.

In addition, according to an embodiment of the present disclosure, the first, second, third and fourth test signal lines TSL1, TSL2, TSL3, and TSL4 130 are connected to the four touch blocks 110 adjacent to one another in the first direction and different from one another, among the touch blocks 110. The first, second, third and fourth test signal lines TSL1, TSL2, TSL3, and TSL4 130 that are different from one another, are connected to the four touch blocks 110 adjacent to one another in the second direction. Furthermore, during an inspection period, while only one of the first, second, third and fourth test signals supplied to the first, second, third and fourth test signal lines TSL1, TSL2, TSL3, and TSL4 130, the test signals being sequentially selected, has the first voltage level, the other test signals have the second voltage level.

Accordingly, when the test signal of the first voltage level is supplied to one of the touch blocks 110, the test signal of the second voltage level is supplied to each of three touch blocks 110 adjacent to one another in the first direction and to each of three touch blocks 110 adjacent to one another in the second direction, with respect to the touch block 110 to which the test signal of the first voltage level is supplied.

In other words, as the test signal of the second voltage level is supplied to the touch blocks 110 adjacent in the first and second directions, among the touch blocks 110, with respect to the touch blocks 110 to which the test signal of the first voltage level is supplied, a short-circuit defect between the adjacent touch blocks 110 and a short-circuit defect between the touch blocks 110 and the routing line 140 that does not correspond thereto may be defected.

As the test signal of the first voltage level is supplied to four touch blocks in order in units of sixteen touch blocks arranged by 4×4, an open defect between the touch blocks 110 and the routing line 140 corresponding thereto may be detected.

Furthermore, since the short-circuit defect and the open defect of the touch blocks 110 are detected by using the first, second, third and fourth test signals supplied to the first, second, third and fourth test signal lines TSL1, TSL2, TSL3, and TSL4 130, accuracy in detecting a defect may be improved compared to the number of the test signal lines.

In other words, when only two test signals are used, two different test signals are supplied to the touch blocks in units of two touch blocks in each of the first and second directions. Accordingly, while only a short-circuit defect between two adjacent touch blocks may be detected, a short-circuit defect between the touch blocks 110 and the routing line 140 that does not correspond thereto may not be detected. In other words, even when a short-circuit defect between the touch blocks 110 is generated due to the routing line 140, since a test signal of an identical voltage level may be supplied to the touch blocks 110 having a short-circuit defect due to the routing line 140, it is impossible to determine whether a short-circuit defect is generated.

In contrast, according to an embodiment of the present disclosure, since the test signal of the first voltage level is supplied to only one of the adjacent four touch blocks 110, a short-circuit defect between the touch blocks 110 of the adjacent four the touch blocks 110 due to the routing line 140 may be detected. Thus, when four test signals are used, accuracy in detecting a defect may be increased by about two times, compared to the case of using two test signals.

Next, in the display panel 100 according to an embodiment of the present disclosure, a method of inspecting a defect in the image output function and a defect in the touch sensing function is described below.

FIGS. 3 to 6 illustrate a method of inspecting a display panel according to an embodiment of the present disclosure.

As described above, in the display panel 100 according to an embodiment of the present disclosure, the four touch blocks 110 adjacent to one another in the first direction are connected to the first, second, third and fourth test signal lines TSL1, TSL2, TSL3, and TSL4 130 that are different from one another, the four touch blocks 110 adjacent to one another in the second direction are connected to the first, second, third and fourth test signal lines TSL1, TSL2, TSL3, and TSL4 130 that are different from one another.

According to an embodiment of the present disclosure, the method of inspecting the display panel 100 by using the auto probing unit 200 may include supplying the second, third, and fourth test signals at the second voltage level while supplying the first test signal at the first voltage level, supplying the first, third, and fourth test signals at the second voltage level while supplying the second test signal at the first voltage level, supplying the first, second, and fourth test signals at the second voltage level while supplying the third test signal at the first voltage level, and supplying the first, second, and third test signals at the second voltage level while supplying the fourth test signal at the first voltage level.

Figure 3:
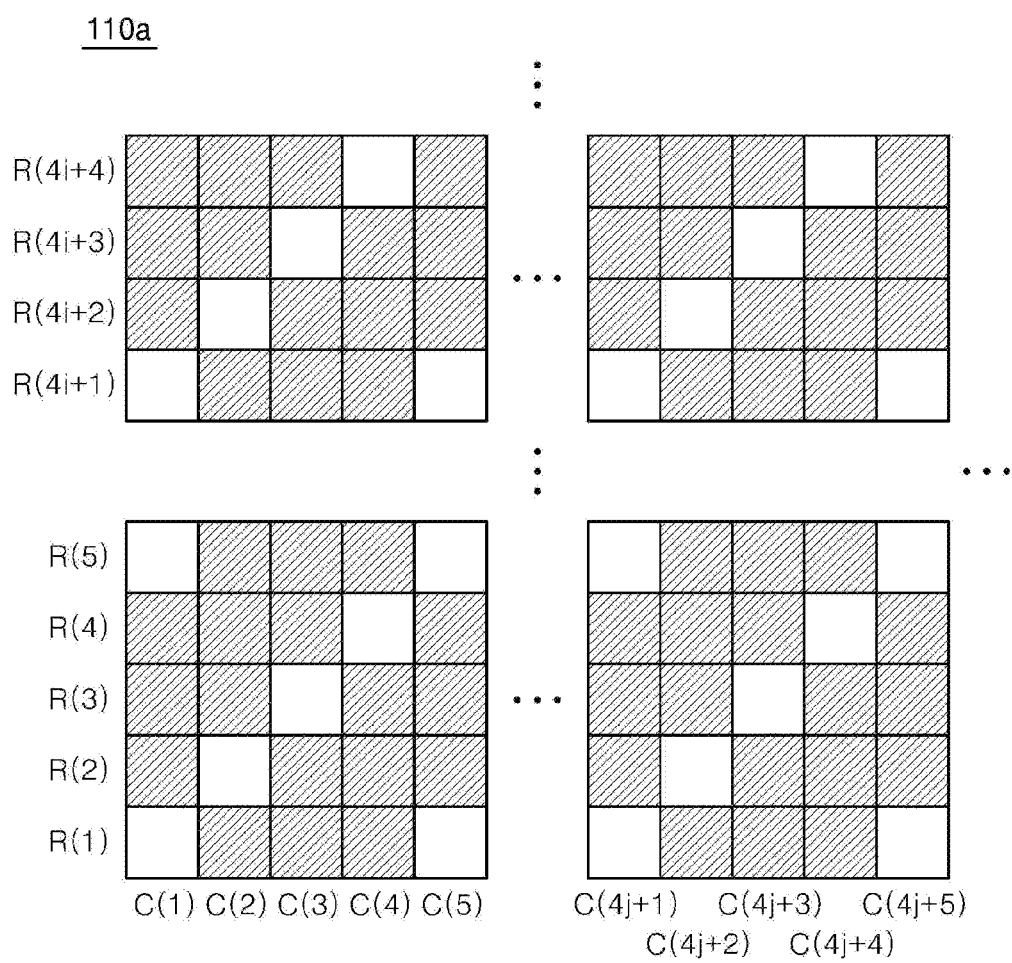
FIGS. 3 to 6 illustrate a method of inspecting a display panel according to an embodiment of the present disclosure.

As an example, as illustrated in FIG. 3, the touch blocks arranged in the (4i+1)th horizontal row R(4$i$+1), where I is an integer equal to or greater than 0, including the first and fifth horizontal rows R(1) and R(5), and in the (4j+1)th vertical column C(4$j$+1), where j is an integer equal to or greater than 0, including the first and fifth vertical columns C(1) and C(5), and the touch blocks adjacent to each of the touch blocks in an upper right diagonal direction, may be connected to the first test signal line TSL1 via the switch unit 150 during the inspection period.

Accordingly, in an operation 110a of supplying the first test signal at the first voltage level, sub-pixels corresponding to the touch blocks arranged in the (4j+1)th vertical column C(4$j$+1) in the (4i+1)th horizontal row R(4$i$+1), and the touch blocks adjacent to each of the touch blocks in the upper right diagonal direction, may be driven to emit light, whereas the other sub-pixels may be in a black state.

Figure 4:
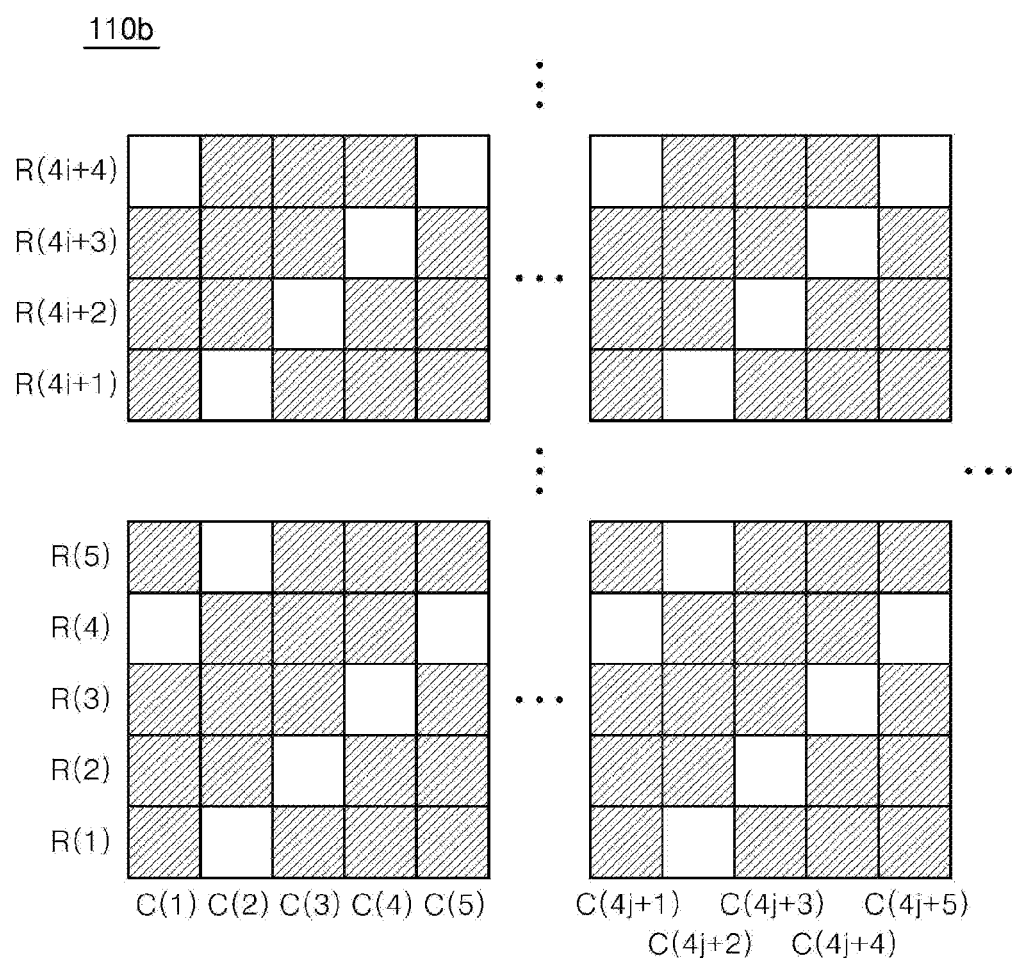

As illustrated in FIG. 4, the touch blocks arranged in the (4j+2)th vertical column C(4$j$+1) including the second vertical column C(2) in the (4i+1)th horizontal row R(4$i$+1), and the touch blocks adjacent to each of the touch blocks in the upper right diagonal direction, may be connected to the second test signal line TSL2 via the switch unit 150 during the inspection period.

Accordingly, in an operation 110b of supplying the second test signal at the first voltage level, sub-pixels corresponding to the touch blocks arranged in the (4j+2)th vertical column C(4$j$+1) in the (4i+1)th horizontal row R(4$i$+1), and the touch blocks adjacent to each of the touch blocks in the upper right diagonal direction, may be driven to emit light, whereas the other sub-pixels may be in a black state.

Figure 5:
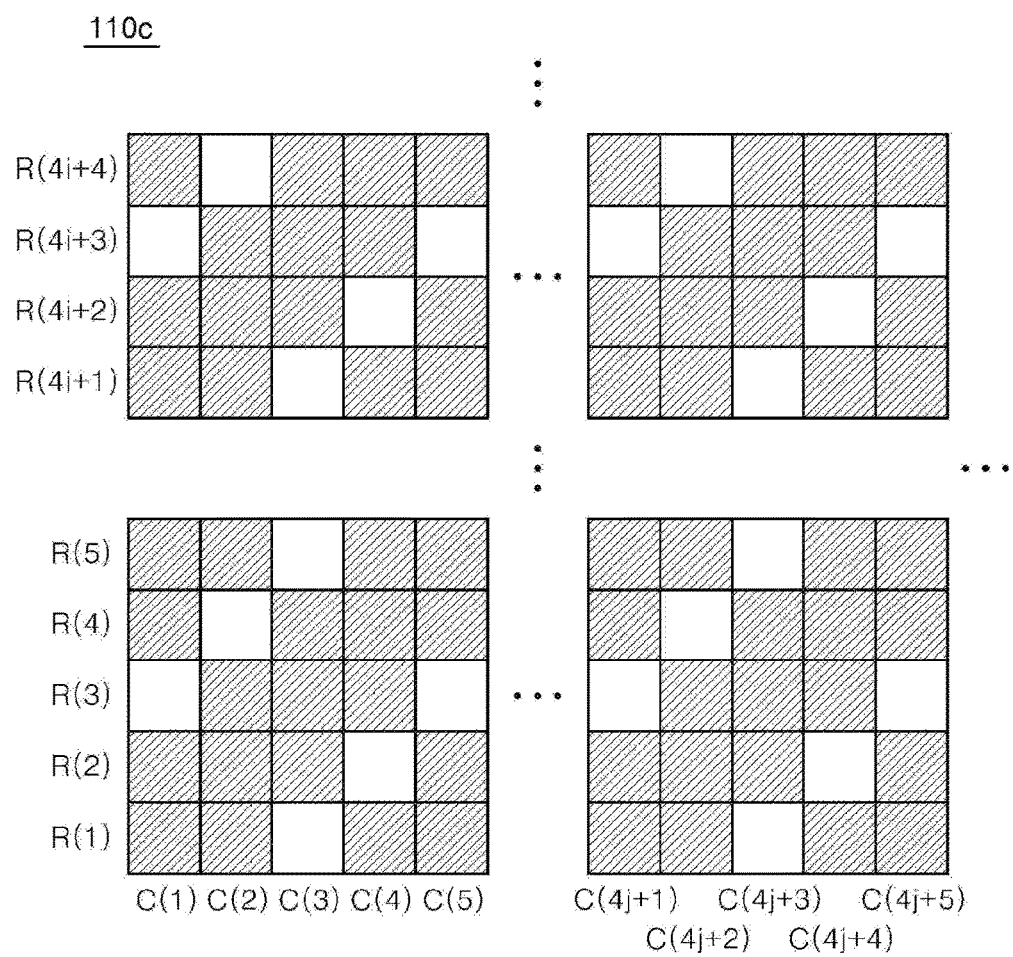

As illustrated in FIG. 5, the touch blocks arranged in the (4j+3)th vertical column C(4$j$+3) including the third vertical column C(3) in the (4i+1)th horizontal row R(4$i$+1), and the touch blocks adjacent to each of the touch blocks in the upper right diagonal direction, may be connected to the third test signal line TSL3 via the switch unit 150 during the inspection period.

Accordingly, in an operation 110c of supplying the third test signal at the first voltage level, sub-pixels corresponding to the touch blocks arranged in the (4j+3)th vertical column C(4$j$+3) in the (4i+1)th horizontal row R(4$i$+1), and the touch blocks adjacent to each of the touch blocks in the upper right diagonal direction, may be driven to emit light, whereas the other sub-pixels may be in a black state.

Figure 6:
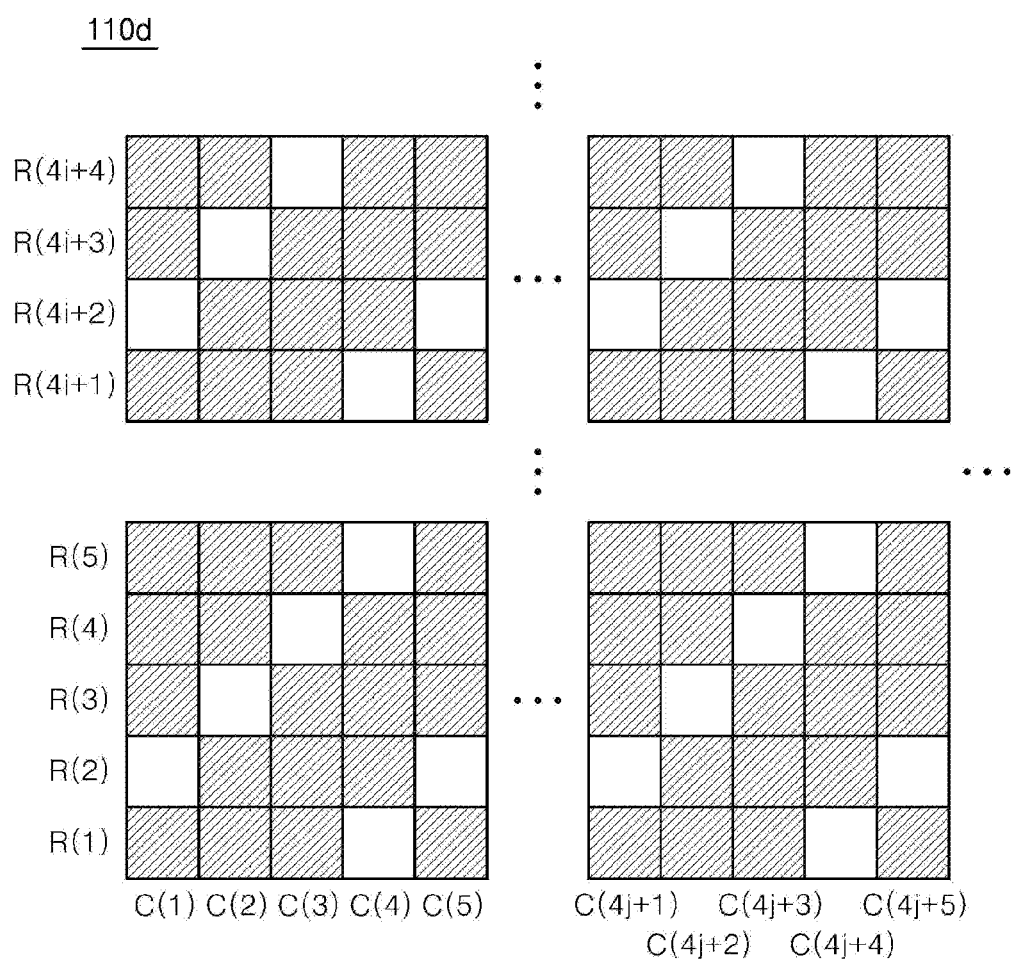

As illustrated in FIG. 6, the touch blocks arranged in the (4j+4)th vertical column C(4$j$+4) including the fourth vertical column C(4) in the (4i+1)th horizontal row R(4$i$+1), and the touch blocks adjacent to each of the touch blocks in the upper right diagonal direction, may be connected to the fourth test signal line TSL4 via the switch unit 150 during the inspection period.

Accordingly, in an operation 110d of supplying the fourth test signal at the first voltage level, sub-pixels corresponding to the touch blocks arranged in the (4j+4)th vertical column C(4$j$+4) in the (4i+1)th horizontal row R(4$i$+1), and the touch blocks adjacent to each of the touch blocks in the upper right diagonal direction, may be driven to emit light, whereas the other sub-pixels may be in a black state.

In each of the operations 110a, 110b, 110c, and 110d, it may be detected to be defective when the luminance of sub-pixels corresponding to each touch block does not match the first, second, third and fourth test signals.

For example, as illustrated in FIG. 3, in the operation 110a of supplying the first test signal at the first voltage level, a case in which a short-circuit defect or an open defect is generated in the touch blocks 110 is described.

Figure 7:
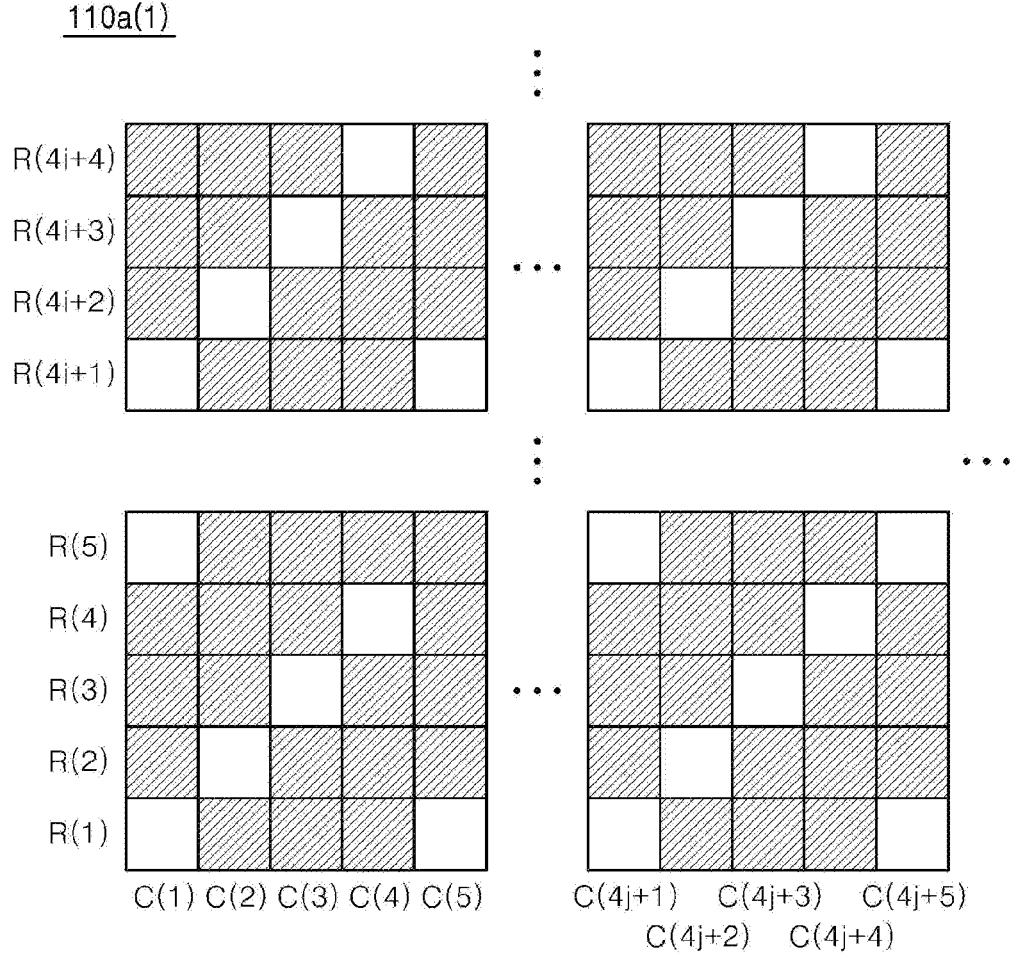
FIGS. 7 to 9 illustrate examples of detecting a defect in a touch sensing function in a process of FIG. 3.
Figure 8:
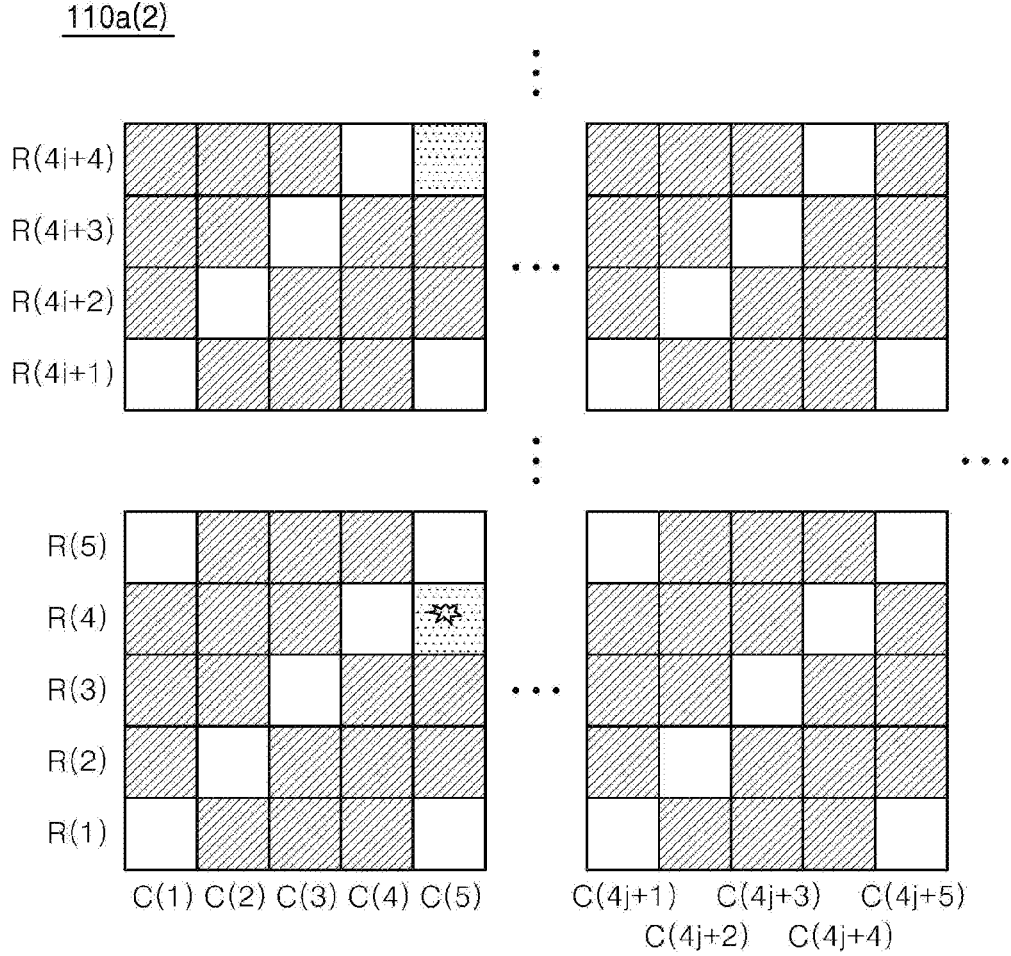
Figure 9:
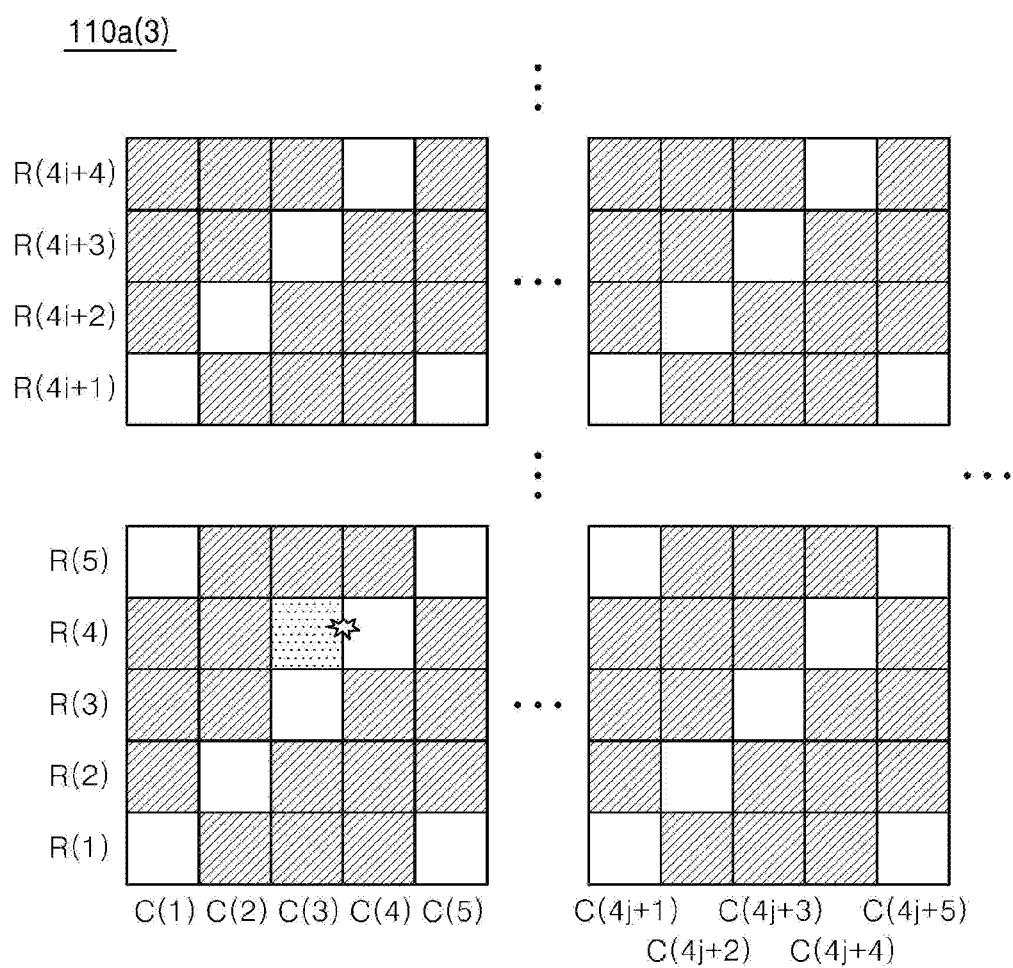

FIGS. 7 to 9 illustrate examples of detecting a defect in the touch sensing function in the process of FIG. 3.

As illustrated in FIG. 7, a touch block (R(5), C(5)) arranged in the fifth vertical column of the fifth horizontal row is connected to the first test signal line TSL1, but is in a block state unlike other touch blocks connected to the first test signal line TSL1. In this case, the touch block (R(5), C(5)) arranged in the fifth vertical column of the fifth horizontal row may be detected to have an open defect with the routing line 140.

As illustrated in FIG. 8, a touch block(R(4), C(5)) arranged in the fifth vertical column of the fourth horizontal row is a touch block connected to the second test signal line TSL2 (see FIG. 4). Although the second test signal is supplied at the second voltage level, the touch block (R(4), C(5)) arranged in the fifth vertical column of the fourth horizontal row is driven to emit light. In this case, the touch block (R(4), C(5)) arranged in the fifth vertical column of the fourth horizontal row may be detected to have a short-circuit defect with other adjacent touch block or the routing line 140 arranged on the fifth vertical column.

Likewise, as illustrated in FIG. 9, a touch block (R(4), C(3)) arranged in the third vertical column of the fourth horizontal row is a touch block connected to the fourth test signal line TSL4 (see FIG. 6). Although the fourth test signal is supplied at the second voltage level, the touch block (R(4), C(3)) arranged in the third vertical column of the fourth horizontal row is driven to emit light. In this case, the touch block (R(4), C(3)) arranged in the third vertical column of the fourth horizontal row may be detected to have a short-circuit defect with other adjacent touch block or the routing line 140 arranged on the third vertical column.

According to an embodiment of the present disclosure, the test pad portion 120 to which the auto probing unit 200 is connected is arranged at opposite sides of the pad area that is a part of the non-display area NA. In this state, each of the two test pad portions 120 arranged at the opposite sides of the pad area may include four pads connected to the first, second, third, and fourth test signal lines TSL1, TSL2, TSL3, and TSL4 130. In other words, each of the two test pad portions 120 may include four pads corresponding to four test signals.

As such, as the number of pads increase in proportional to the number of test signals, there is a limit in reducing a bezel width of the display panel 100.

Accordingly, in another embodiment of the present disclosure, a display panel is provided, which may reduce the increase in the bezel width of the display panel 100 in proportional to the number of test signals.

Figure 10:
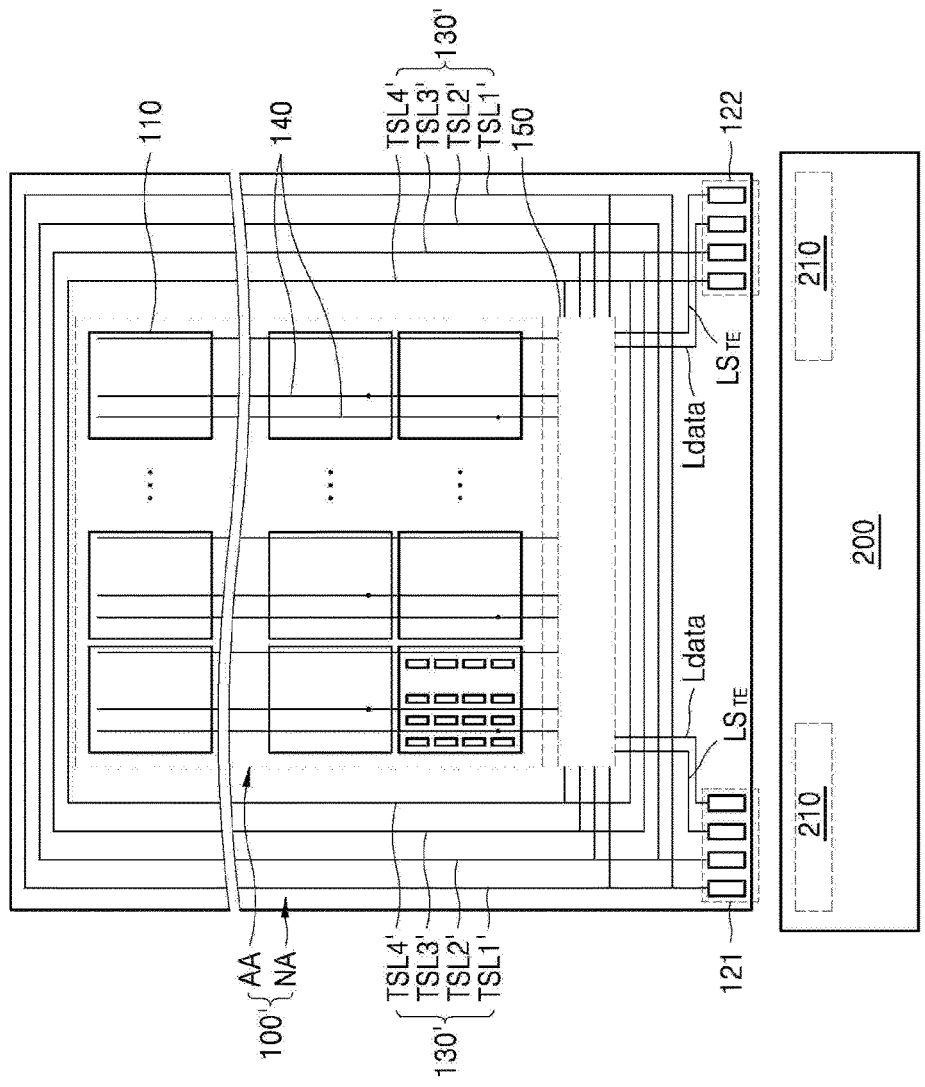
FIG. 10 illustrates a display panel according to another embodiment of the present disclosure.

FIG. 10 illustrates a display panel according to another embodiment of the present disclosure.

As illustrated in FIG. 10, since a display panel 100' according to another embodiment of the present disclosure is substantially the same as the embodiment described in FIGS. 1 to 9, except that first and second test pad portions 121 and 122 include pads corresponding to two different test signal lines 130' and that each test signal line 130' has a closed loop shape surrounding the periphery of the display area AA, redundant descriptions are omitted below.

The display panel 100' according to another embodiment of the present disclosure may include the first and second test pad portions 121 and 122 arranged at opposite sides of the pad area adjacent to one side of the display area AA in the non-display area NA and including pads to which the auto probing unit 200 is connected.

In other words, the first test pad portion 121 may be arranged at one side of the pad area corresponding to the left side of the display area AA of FIG. 10, and the second test pad portion 122 may be arranged at the other side of the pad area corresponding to the right side of the display area AA of FIG. 10.

Any one of the first and second test pad portions 121 and 122 may include pads connected any two of the first, second, third and fourth test signal lines 130', and the other of the first and second test pad portions 121 and 122 may include pads connected to the other two of the first, second, third and fourth test signal lines 130'.

For example, the first test pad portion 121 may include two pads connected to the first and second test signal lines TSL1' and TSL2'.

The second test pad portion 122 may include two pads connected to the third and fourth test signal lines TSL3' and TSL4'.

Furthermore, each of the first, second, third and fourth test signal lines TSL1', TSL2', TSL3', and TSL4' 130' is formed in a closed loop shape in the non-display area NA, and connected to the switch unit 150.

As such, as each of the first, second, third and fourth test signal lines TSL1', TSL2', TSL3', and TSL4' is in a closed loop shape, the pads corresponding to the first, second, third and fourth test signal lines TSL1', TSL2', TSL3', and TSL4' may be arranged not in both of the first and second test pad portions 121 and 122, but in any one of the first and second test pad portions 121 and 122.

Accordingly, since the increase in the bezel width of the display panel 100' in proportional to the number of test signals is prevented, the bezel width may be reduced.

As described above, the display panel according to the above-described embodiment of the present disclosure includes the first, second, third and fourth test signal lines through which the first, second, third and fourth test signals are supplied. Accordingly, a defect in a plurality of touch blocks may be inspected by using the first, second, third and fourth test signals. In other words, since not only the defect in the image output function, but also the defect in the touch sensing function can be inspected prior to the modularization process, yield of a display device including a display panel may be improved, and the manufacturing costs of a display device may be reduced.

The present disclosure described above may be variously substituted, altered, and modified by those skilled in the art to which the present inventive concept pertains without departing from the scope and sprit of the present disclosure.

Therefore, the present disclosure is not limited to the above-mentioned exemplary embodiments and the accompanying drawings.

What is claimed is:

1. A display panel comprising:
   a plurality of pixel areas defined in a display area and matrix-arranged, the plurality of pixel areas corresponding to a plurality of sub-pixels;
   a plurality of touch blocks matrix-arranged, each touch block corresponding to two or more adjacent pixel areas of the plurality of pixel areas;
   a first test signal line conducting a first test signal received from an auto probing unit;
   a second test signal line conducting a second test signal received from the auto probing unit;
   a third test signal line conducting a third test signal received from the auto probing unit;
   a fourth test signal line conducting a fourth test signal received from the auto probing unit; and
   a plurality of routing lines, each of the routing lines connected between one of the first, second, third, and fourth test signal lines and one of the plurality of touch blocks,
   wherein four touch blocks of the plurality of touch blocks adjacent along a first direction are each connected to a different one of the first, second, third, and fourth test signal lines, and
   wherein four touch blocks of the plurality of touch blocks adjacent along a second direction perpendicular to the first direction are each connected to a different one of the first, second, third, and fourth test signal lines.

2. The display panel of claim 1, wherein one of the first, second, third and fourth test signals is selected to be supplied at a first voltage level, and the others of first, second, third and fourth test signals, except the selected test signal, are supplied at a second voltage level that is different from the first voltage level.

3. The display panel of claim 2, wherein, while identical pixel signals are supplied to a plurality of pixel electrodes corresponding to the plurality of pixel areas, the auto probing unit supplies the first, second, third and fourth test signals to the plurality of touch blocks.

4. The display panel of claim 1, further comprising a switch unit arranged between the first, second, third and fourth test signal lines and the plurality of routing lines and comprising a plurality of test drive switches that are turned on based on a test enable signal supplied by the auto probing unit,
   wherein the first, second, third and fourth test signal lines are connected to the plurality of touch blocks through turned-on test drive switches.

5. The display panel of claim 1, further comprising first and second test pad portions arranged at opposite sides of a pad area adjacent to one side of the display area in a non-display area that is disposed outside the display area, each of the first and second test pad portion comprising pads to which the auto probing unit is connected.

6. The display panel of claim 5, wherein the first test pad portion is arranged on a first side of the pad area and comprises pads connected to two of the first, second, third and fourth test signal lines, and
   the second test pad portion is arranged on a second side of the pad area and comprises pads connected to two of the first, second, third and fourth test signal lines not connected to the first test pad portion.

7. The display panel of claim 6, wherein each of the first, second, third and fourth test signal lines is arranged in the non-display area and has a closed loop shape surrounding a periphery of the display area.

* * * * *